United States Patent [19]

Parkola

[11] 4,392,145

[45] Jul. 5, 1983

[54] MULTI-LAYER INK JET APPARATUS

[75] Inventor: Walter R. Parkola, Newtown, Conn.

[73] Assignee: Exxon Research and Engineering Co., Florham Park, N.J.

[21] Appl. No.: 239,612

[22] Filed: Mar. 2, 1981

[51] Int. Cl.[3] .............................................. G01D 15/18

[52] U.S. Cl. ................................................ 346/140 R

[58] Field of Search .................................... 346/140 R

[56] References Cited

U.S. PATENT DOCUMENTS

| | | | |
|---|---|---|---|
| 3,946,398 | 3/1976 | Kyser | 346/140 X |
| 3,988,745 | 10/1976 | Sultan | 346/140 |
| 4,115,789 | 9/1978 | Fischbeck | 346/140 |
| 4,158,847 | 6/1979 | Heinzl | 346/140 |

OTHER PUBLICATIONS

Anschel et al.; Modular Drop-On-Demand Ink Jet Printing Head; IBM TDB, vol. 20, No. 12, May 1978, pp. 5425–5428.

Lee et al.; Laminated Ink Jet Head; IBM TDB, vol. 23, No. 7A, Dec. 1980, pp. 2955–2957.

*Primary Examiner*—Joseph W. Hartary
*Attorney, Agent, or Firm*—Norman L. Norris

[57] ABSTRACT

Multi-layer ink jet apparatus 10,110 includes a plurality of channels 12,112 comprising chambers including inlets and orifices 14,114 and transducers 22,122 coupled to the chambers 24,124. The various channels 12,112 are located in different layers 16,116 that stagger with respect to a plane transverse to the layers 16,116 so as to achieve a high density array of ink jet orifices 14,114.

11 Claims, 8 Drawing Figures

MULTI-LAYER INK JET APPARATUS

BACKGROUND OF THE INVENTION

This invention relates to ink jet arrays including a plurality of ink jet channels where each channel includes a chamber, an inlet to the chamber, an orifice from the chamber and transducer means coupled to the chamber for ejecting droplets of ink from the chamber as a function of the state of energization of the transducer.

Layered or laminated ink jet structures are utilized to facilitate fabrication of ink jets which necessarily require a high degree of precision. Even higher degrees of precision are required in densely packed multi-channel impulse ink jet arrays.

However, there are certain limitations on high density packing of ink jet arrays. The most important limitation involves cross talk between channels. Of course, cross talk is undesirable and it is, therefore, necessary to provide a certain structural spacing between channels. This is sometimes achieved by using a fan-in technique such as that disclosed in U.S. Pat. No. 3,988,745—Sultan. As also shown herein, the ink jet chambers and transducers associated therewith are staggered with respect to one another. There are, however, limitations as to the amount of fanning in which may be done and this necessarily imposes limitations on the number of channels which may be utilized in such an array. Moreover, when attempts are made to add channels by adding layers to the device, the spacing or resolution of the channels within the device is increased, i.e., the clarity is reduced.

SUMMARY OF THE INVENTION

It is an object of this invention to achieve a multi-channel, high-density array of ink jets.

It is a more specific object of this invention to achieve a multi-channel, high-density array of ink jets which may be readily fabricated.

It is a further specific object of this invention to achieve a multi-channel, high-density ink jet array which is unlimited in the number of channels which may be employed.

In accordance with these and other objects of the invention, a preferred embodiment of the invention comprises an ink jet apparatus including a plurality of channels wherein each of the channels includes a chamber, an inlet opening to the chamber and an ink droplet ejection orifice. In accordance with this invention, the apparatus comprises a plurality of layers having at least one layer wherein different functions for more than one channel are performed.

In one embodiment of the invention, the chamber of one channel and the transducer of another channel are located in the same layer. In this embodiment, both a portion of the chamber and a restrictor for one channel may be formed in that same layer.

In the same or another embodiment of the invention, a deformable wall of one channel between the transducer and the chamber thereof and another nondeformable wall of another channel may be located in the same layer.

In accordance with another important aspect of the invention, a first plurality of the channels may be non-aligned with respect to a plane extending transverse to the layers.

In accordance with another important aspect of the invention, a second plurality of the channels including at least one channel from the first plurality may be aligned with respect to a plane extending transverse to the layers. The second plurality of channels may be supplied by a single supply channel extending transverse to the layers.

DETAILED DESCRIPTION OF PREFERRED EMBODIMENTS

Figure 1:
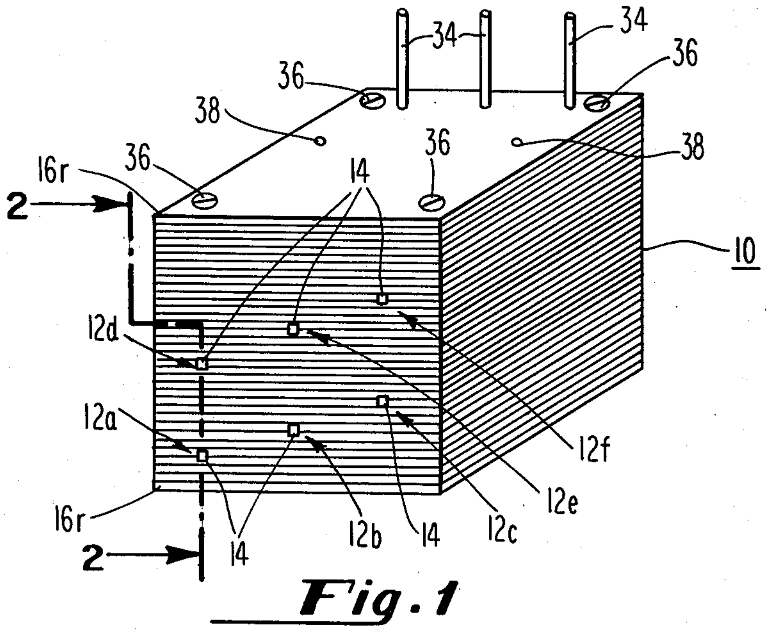
FIG. 1 is a perspective view of a laminated structure representing one preferred embodiment of the invention in an ink jet apparatus.
Figure 2:
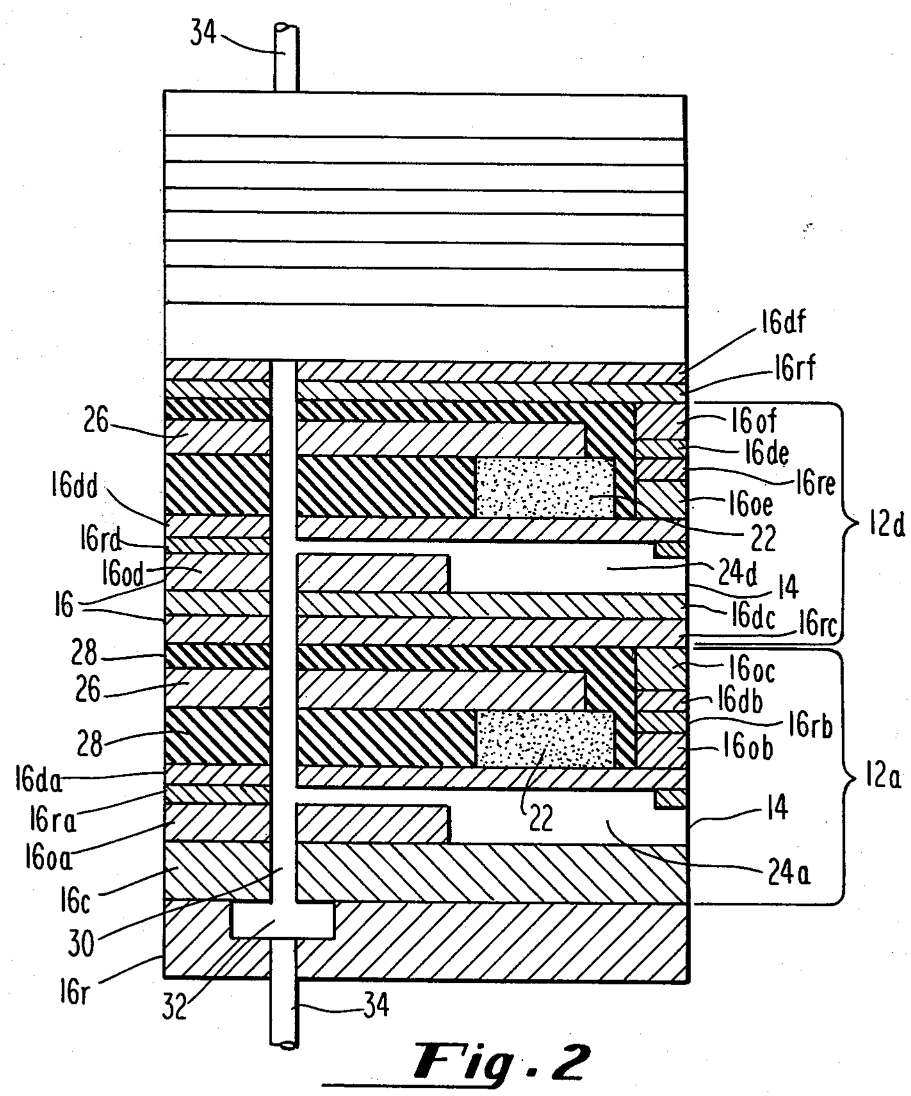
FIG. 2 is a sectional view of the apparatus of FIG. 1 displaying the various ink jet orifices.
Figure 3:
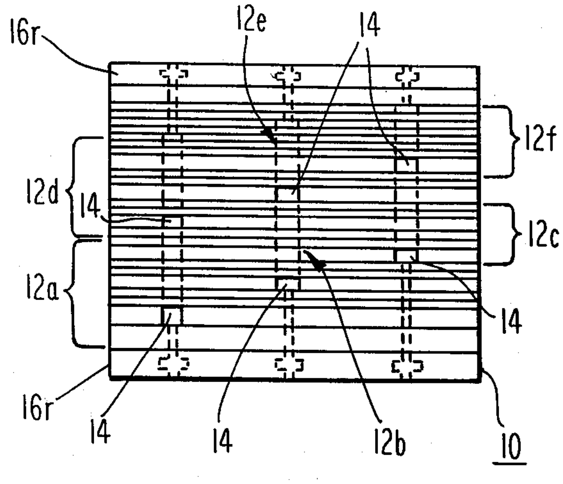
FIG. 3 is a front elevational view of apparatus shown in FIG. 1.

Referring to FIGS. 1–3, a laminated structure 10 includes a plurality of channels 12(*a–f*) including orifices 14 for ejecting droplets of ink.

In accordance with one important aspect of this invention, each of the orifices 14 is located in a different lamination or layer 16. This may be appreciated by reference to FIGS. 1 and 3 wherein the orifices 14 are shown as located at different depths within the structure 10. This achieves an array of orifices 14 which are slanted with respect to the planes of the layers 16.

In accordance with another important aspect of the invention, the same layer or lamination in the structure 10 serves different functions with respect to different channels. Referring to FIG. 2, the channel 12*a* is formed by a plurality of laminations including the lamination 16*oa* which forms the orifice of the the channel 12*a*, the lamination 16*ra* which serves as a restrictor and a portion of the chamber in the channel 12*a*, and the lamination 16*da* which serves as a diaphragm associated with a transducer 22 of the channel 12*a*. These laminations in combination with a cover lamination 16*c* form the channel 12*a* which includes a compression chamber 24 which is communicated with by the transducer 22 through the diaphragm lamination 16*da*.

In order to accommodate the transducer 22 and the associated electrical contact 26, it is necessary to provide openings in the adjacent laminations 16. However, these laminations 16 must, in accordance with this invention, serve functions for the other channels which lie at least in part at the same depth in the laminated structure. Accordingly, it is necessary to provide room for the transducer 22 and the contact 26 and laminations which also serve different functions in adjacent channels. Referring to FIG. 2, the necessary space or opening for the transducer 22 is, therefore, provided in a lamination 16*ob* which also serves as an orifice lamination for the channel 12*b* and a lamination 16*rb* which also serves as a restrictor in the channel 12*b*. A necessary space or opening for the contact 26 is provided in a lamination **16*db* which serves as the diaphragm for channel 12*b* and a lamination 16*oc* which forms an orifice for the channel 12*c*. These laminations complete the channel 12*a* except for the addition of some insulation 28 surrounding the transducer 22 and the contact 26 and a supply conduit 30 which is fed transversely through the various laminations 16. The conduit 30 is, of course, formed by aligned openings in the various laminations 16**.

Referring still to FIG. 2, the channel **12*d* is located immediately above the channel 12*a* and comprises a series of laminations substantially identical to the laminations which form the channel 12*a*. Accordingly, the various laminations which form the channel 12*d* perform other functions for other channels. For example, the bottom of the chamber 24*d* of the channel 12*d* is formed by the lamination 16*rc* and the lamination 16*dc* which serve as a restrictor and a diaphragm respectively for the channel 12*c*. The chamber 24 as well as the orifice 14 for the channel 12*d* are formed by lamination 16*od*. The remainder of the channel 12*d* is formed by laminations 16*rc*, 16*dc*, 16*rd*, 16*dd*, 16*oe*, 16*re*, 16*de*, 16*of*, 16*rf* and 16df**. As clearly suggested by the letters associated with the various laminations, these laminations also serve orifice, restrictor and diaphragm functions of adjacent channels in accordance with this invention.

The laminated structure 10 includes a reservior plate or lamination **16*r* at opposite extremities of the structure 10 as shown in FIGS. 1–3. The reservoir plates 16*r* include reservior chambers 32 which are coupled to the conduit 30 and suitable tubing 34 adapted to couple the structure 10 to a suitable source of ink. As shown in FIG. 1, the entire laminated structure 10 may be maintained as a unit by the use of screws 36. Holes 38 which are also shown in FIG. 1 provide convenient means for aligning the various laminations 16** during the assembly process.

Figure 4:
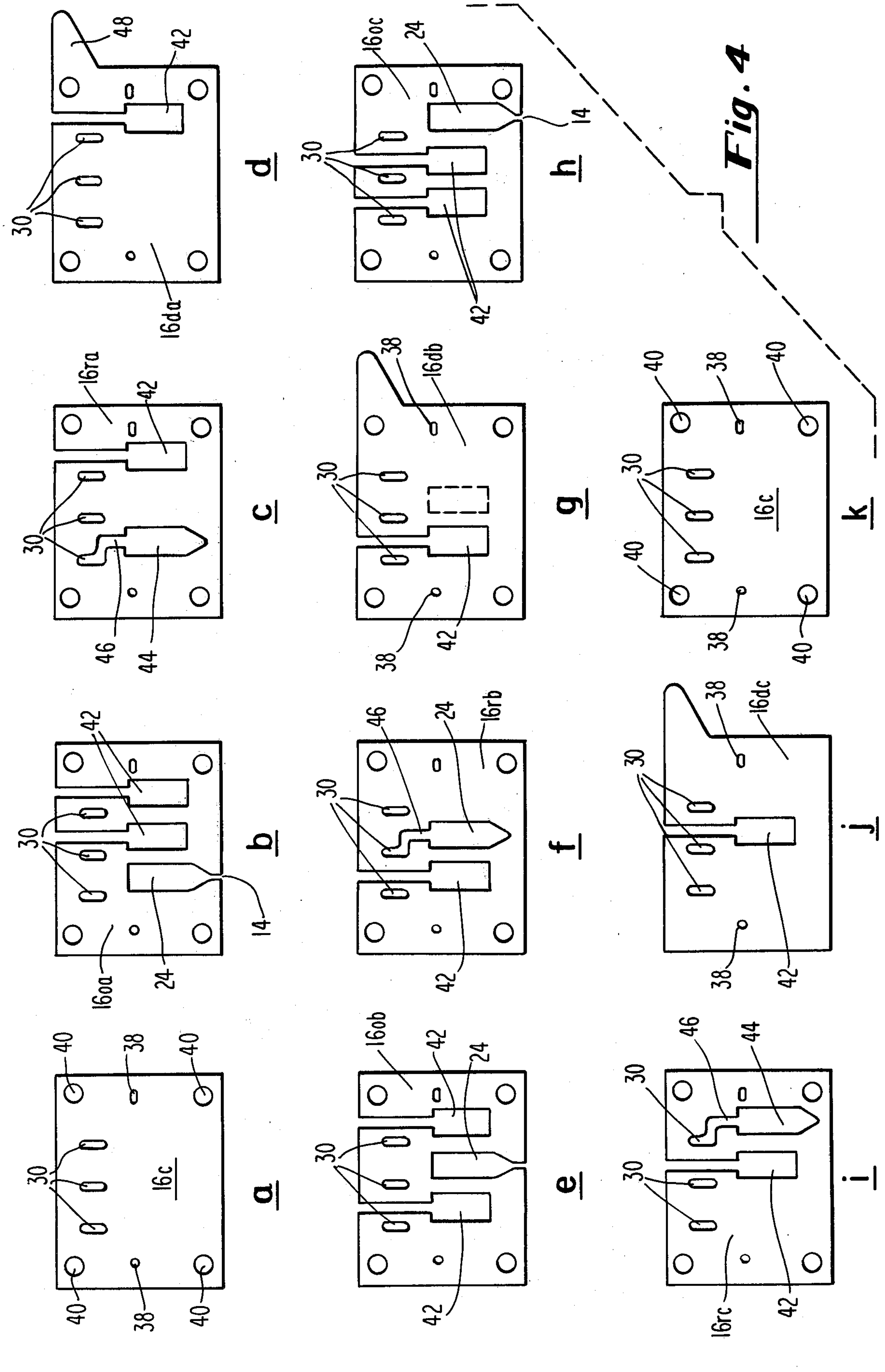
FIGS. 4(*a–j*) are plan views of the various layers of the embodiment shown in FIGS. 1 and 2.

Reference is now made to FIGS. 4(*a–k*) for a further discussion of the various laminations 16 and the portions of the various channels formed thereby.

FIG. **4*a* depicts the bottom cover 16*c*. As shown therein, the cover includes a plurality of holes 40 located at the four corners thereof for purposes of fastening the various laminations 16 together. Holes 38 are also shown which are utilized in aligning the various laminations 16. In addition, openings are shown which form the conduit 30. It will be appreciated that the cover 16*c* shown in FIG. 4*a* serves only a single function except for the conduit function provided by the openings 30, namely, the lower wall of the chamber 24 of the channel 12*a*.**

FIG. **4*b* depicts the lamination of 16*oa* which includes an opening forming the chamber 24 as well as the orifice 14 for the channel 12*a*. In addition, the lamination 16*oa* includes openings 42 which are adapted to accommodate transducers 22 and contacts 26 for adjacent channels. However, since the lamination 16*oa* is used at the bottom of the laminated structure 10, the openings 42 are not required. However, their presence does permit the same lamination 16*oa* to be utilized in other positions in the laminated structure 10. More specifically, the lamination 16*oa* may be utilized to form the chamber 24 and the orifice 14 of the channel 12*d*. Accordingly, the lamination 16*od* shown in FIG. 2 may be identical with the lamination 16*oa*.** This, of course, reduces the cost of fabrication since interchangeable parts may be utilized.

Referring now to FIG. **4*c*, the restrictor lamination 16*ra* is shown. The lamination 16*ra* includes an area 44 which is connected to the conduit 30 by means of a channel 46. Once again, an opening 42 is provided in the lamination 16*ra* so as to provide room for the transducer 22 and/or the contact 26 of an adjacent channel to provide the lamination interchangeability discussed in the foregoing. In other words, the lamination 16*ra* may be interchanged with the lamination 16*rd* shown in FIG. 2**.

FIG. **4*d* illustrates the lamination 16*da* which forms the diaphragm between the chamber 24 and the transducer 22 in the channel 12*a*. As shown in FIG. 4*d*, the transducer 22 will contact the lamination 16*da* in the area enclosed within dotted lines. Since the lamination 16*rd* does provide for electrical connection with the transducer 22, a tab 48 is provided for facilitating electrical connection. In this regard, it will be understood that the lamination 16*da* may comprise a conductive material. FIG. 4*d* also shows the opening or area 42 which is adapted to receive the transducer 22 and/or contact 26 of an adjacent channel. Once again, it will be appreciated that the lamination 16*da* may be substituted or interchanged with a lamination for another channel, in particular, the lamination 16*dd* shown in FIG. 2**.

The lamination **16*ob* as shown in FIG. 4*e* includes the chamber 24 and the orifice 14 for the channel 12*b*. Openings 42 are provided but only the opening 42 at the left of the chamber 24 is utilized to provide space for an actual transducer, i.e., the transducer 22 associated with the channel 12*a*. However, the lamination 16*ob* is interchangeable with the lamination 16*oe* used in forming the channel 12*e* and in that channel both of the openings 42 would be required to provide room for the transducers associated with channel 12*d* as well as channel 12*c*.**

Referring to FIG. **4*f*, a chamber opening 24 and a passageway 46 back to the opening 30 is provided to serve as a restrictor for the chamber 24 and the channel 12*b*.**

FIG. **4*g* represents the lamination 16*db* including an opening 42 to receive the transducer 22 and the contact 26 for the channel 12*a*. The transducer 22 for the channel 12*b* is adapted to rest on the lamination 16*db* in a position shown in dotted lines so as to provide a ground connection for the transducer 22 through a tab 48. It will be appreciated that the lamination 16*rb* and 16*db* as well as the lamination 16*ob* are interchangeable for lamination 16*re*, 16*de* and 16*oe* for the channel 12*e* as shown in FIG. 2**.

FIG. **4*h* shows the lamination 16*oc* including the chamber 24 and the orifice 14 for the channel 12*c*. In addition to the conduit openings 30, openings 42 are provided to accommodate the transducers for the channels 12*a* and 12*b*** respectively.

FIG. **4*i* represents the lamination 16*rc* which provides the restrictor for the channel 12*c*. For this purpose, the lamination 16*rc* comprises opening 44 and a passageway 46 connected back to the conduit opening 30. In addition, an opening 42 is provided to accommodate the transducer 22 and the contact 26 for the channel 12*b*.**

FIG. **4*j* depicts the lamination 16*dc* which serves as the diaphragm for the chamber 12*c* on which the transducer 22 rests as shown by the dotted lines. An opening 42 is provided to accommodate the transducer 22 and the contact 26 for the channel 12*b*. A tab 48 again provides the ground connection for the transducer which is bonded to the lamination 16*dc*. It will be appreciated that the lamination 16_oc,_ 16_rc_ and 16_dc_ may be interchanged for the laminations associated with the channel 12_f_ in the laminated structure 10**.

Finally, a top cover 16_c_ is shown in FIG. 4_k_. The cover 16 as well as other laminations in FIGS. 4(_b–j_) includes the holes 38 and 40 as well as the conduit openings 30 which are also shown in the bottom cover in FIG. 4_a_. However, it will be understood that the top cover 16_c_ is not placed on top of the lamination 16_dc._ Rather, it is placed on top of the entire six-channel array, just below the reservior plate 16_r_. It will be understood that additional laminations may be added before applying the top cover 16_c_ so as to provide a virtually unlimited number of channels in a high density array.

With reference to FIGS. 4(_a–k_), it will be appreciated that the individual laminations 16 provide different functions for different channels. For example, FIG. 4_b_ shows the lamination 16_oa_ which, when used in place of the lamination 16_od,_ forms the chamber 24 for the channel 12_d_ as well as areas provided by the openings 42 for accommodating the transducers 22 for the channels 12_e_ and _f_. This permits the chamber 24 for one channel and the transducer 22 for another channel to be located in the same layer or lamination, i.e., at the same depth in the laminated structure 10.

From FIG. 4_c_, it may be seen that the lamination 16_ra_ when used in place of the lamination 16_rd_ serves as a restrictor for the channel 12_d_ of virtue of the opening 46 and an area 42 accommodates the transducer 22 for the channel 12_f_. In other words, the restrictor for one channel is located on the same layer as the transducer for another channel, i.e., both the restrictor and the transducer are located at the same depth in the laminated structure 10.

Referring to FIG. 4_d_, the lamination 16_da_ when utilized as the lamination 16_dd_ in FIG. 2 provides the deformable conductive wall for the transducer 22 and the channel 12_d_ while also providing the nondeformable lowermost wall of the chamber 24 in the channel 12_e_.

Other dual functions are performed by the various laminations shown in FIG. 4. For example, the lamination 16_ob_ provides the chamber 24 for the channel 12_b_ while also providing openings 42 to accommodate transducers of other channels.

As stated previously, the orifices 14 are located in different laminations at different depths in the laminated structure 10. In the case of the laminated structure of FIG. 3, no two orifices 14 are located in the same layer and pluralities of orifices are aligned in planes perpendicular to the layer. However, this is not necessary where a particularly compact ink jet array is desired. As shown in the laminated structure 10 of FIGS. 1–4, certain pluralities (i.e. pairs) of orifices 14 are aligned in planes transverse to the various laminations 16. However, this may be modified so as to stagger (i.e., maintain nonaligned) a plurality of orifices 14 through the various layers of the laminated structure 10 as well as through planes perpendicular or transverse to the laminations 16 of the structure 10.

Figure 6:
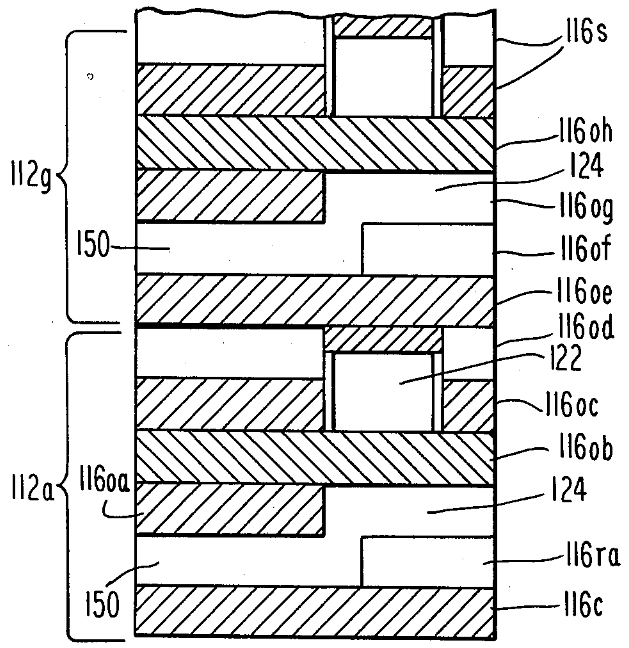
FIG. 6 is a sectional view of the structure shown in FIG. 5.
Figure 5:
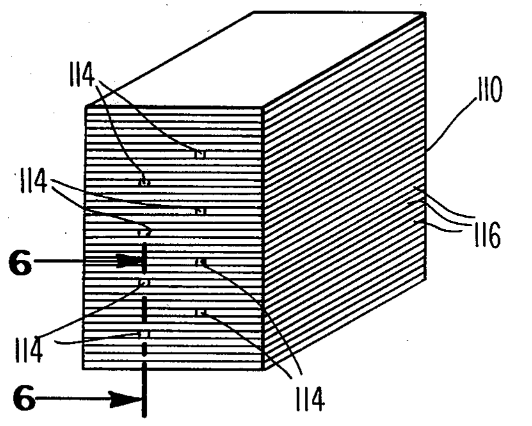
FIG. 5 is a perspective view of another embodiment of the invention.

Referring to FIGS. 5 and 6, another ink jet apparatus is formed in a laminated structure 110. The laminated structure 110 includes a plurality of orifices 114. A total of eight orifices 114, for example, are provided with each orifice being located in a different layer or lamination with two sets of four orifices 114 which are aligned in planes substantially transverse or perpendicular to the laminations 116.

Figure 7:
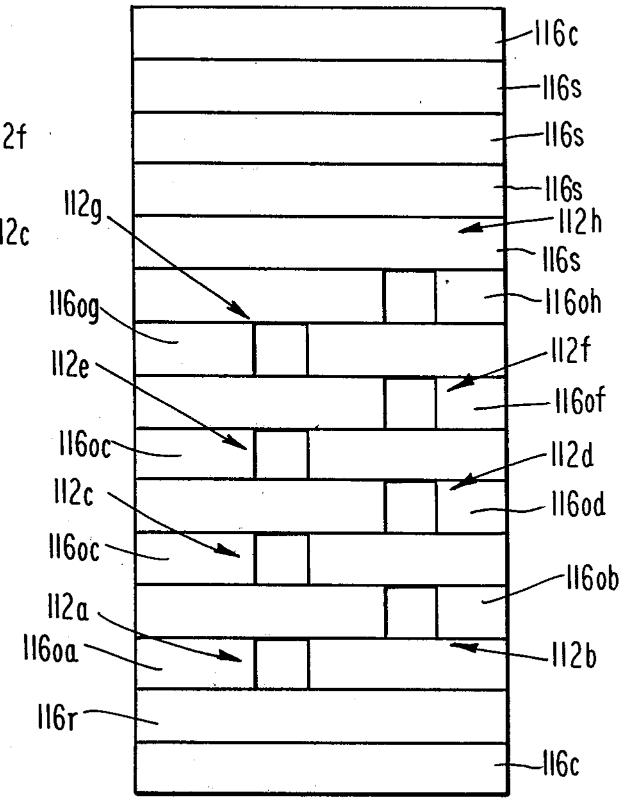
FIG. 7 is a front elevational view of the embodiment shown in FIG. 5.

Referring to FIG. 6, the various laminations are shown which are associated with the channels 12_a_ and 12_g_. Channel 12_a_ is formed by the lamination 116_c_ which forms a lowermost portion of an inlet passageway 150 which may include a restriction coupled to a chamber 124 formed in lamination 116_oa._ The top of the chamber 124 is formed by lamination 116_ob_ in which the orifice 114 for the channel 112_b_ is located and the lamination 116_ob_ also provides communication between a transducer 122 and the chamber 124 where the transducer 122 is located in openings of the laminations 116_oc_ and 116_od._ As shown in FIG. 7, the lamination s 116_oc_ and 116_od_ include the orifices for channels 112_c_ and 112_d._

The channel 112_g_ is formed by laminations 116_oe,_ 116_of,_ 116_og,_ 116_oh_ and laminations 116_s_ which serve as spacers to accommodate the transducer 122 of the channel 112_g_. As shown in FIG. 7, the laminations 116_oe,_ 116_of,_ 116_og_ and 116_oh_ form the orifices for the channels 112_e,_ 112_f,_ 112_g_ and 112_h_ respectively.

From the foregoing, it will be appreciated that adjacent laminations include orifices 114 and chambers 124. In order to accommodate this extremely dense array of orifices 114, it becomes necessary to avoid alignment of adjacent chambers 124 even though adjacent orifices 114 are aligned. In this connection, reference will now be made to FIG. 8.

Figure 8:
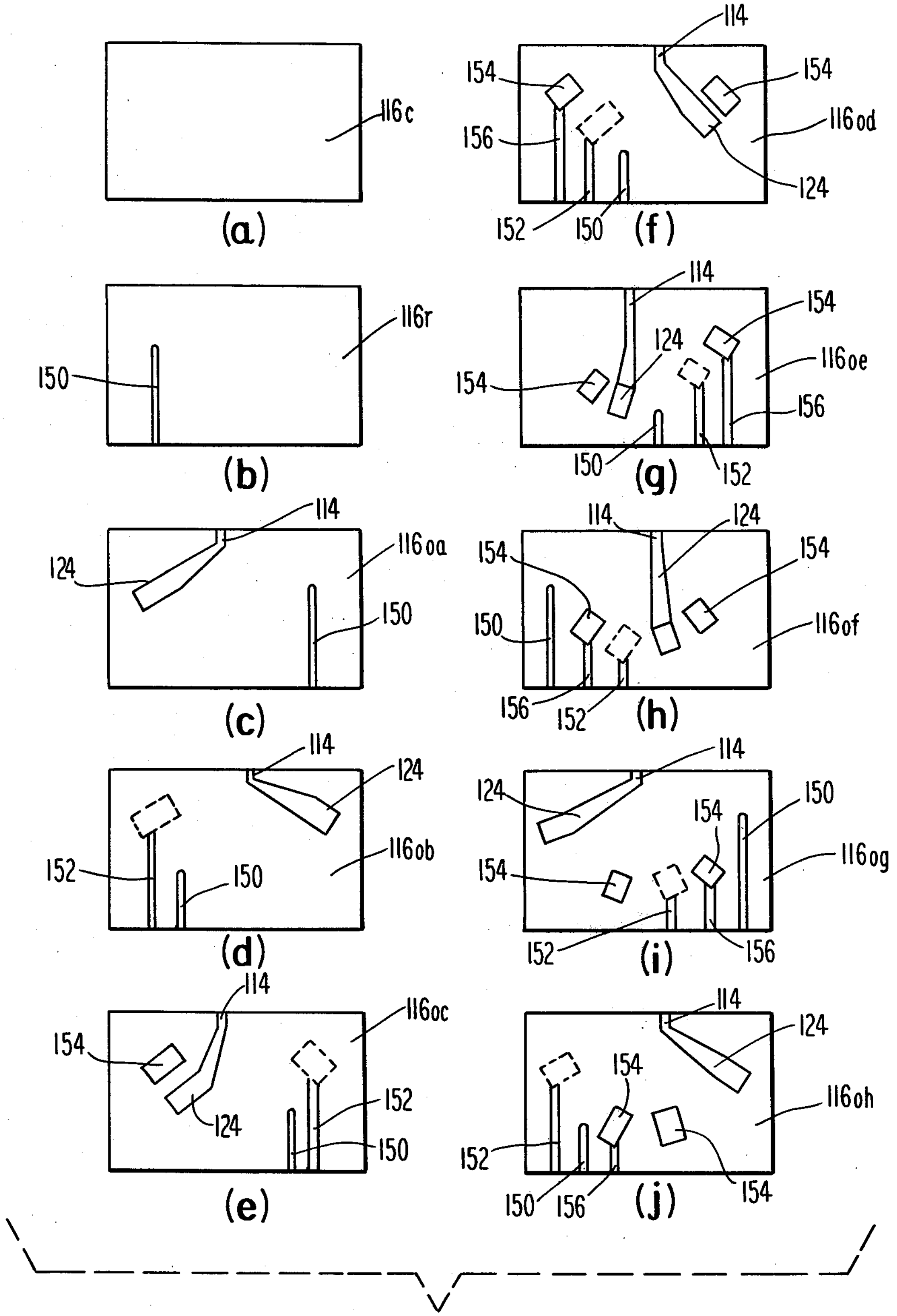
FIGS. 8(*a–n*) are plan views of the various layers of the embodiment shown in FIGS. 5–7.

The various laminations 116 are shown in FIG. 8. FIG. 8_a_ illustrates the cover lamination 116_c_ while FIG. 8_b_ illustrates the restrictor lamination 116_r_ including a passageway or opening 150. The passageway or opening 150 communicates with the chamber 124 in the lamination 116_oa_ which fans into the orifices 114. The lamination 116_oa_ also includes an inlet opening or passageway 150 which is adapted to serve the channel 112_b_.

The lamination 116_ob_ includes the chamber 124 for the channel 12_b_ and an electrical contact layer 152 which communicates with a transducer position shown in dotted lines. Another restrictor passageway 150 is also located in the lamination 116_ob_ which supplies the channel 12_c_.

Although the various other laminations shown in FIG. 8 will not be discussed in detail, it will be appreciated by the reference characters utilized that similar functions herein described apply. It will be noted that there is no repetition in the chamber position 124 except for laminations which are substantially spaced from one another as depicted in FIG. 6. In this connection, it will be noted that the chambers 124 and both the lamination 116_oa_ and the lamination 116_og_ substantially correspond. The same is true with respect to the chambers 124 and the laminations 116_ob_ and 116_oh._ Note also the uses of holes or openings 154 adapted to accommodate transducers as well as a conductive tab 156 which provides an electrical connection to the transducer.

As in the embodiment of FIGS. 1–4, the embodiment of FIGS. 5–8 also employs laminations where the single lamination serves different functions in different channels. Indeed, the various laminations 116 shown in FIG. 8 make it clear that a multiplicity of functions is served by a single lamination. For example, the laminations 116_od,_ 116_oe,_ 116_of,_ 116_og_ and 116_oh_ provide five different functions for five different channels each.

It will be appreciated that various bonding techniques may be employed to fabricate the various structures disclosed herein. For example, it is desirable to employ an epoxy to form the bond between the laminations. Suitable epoxies such as #MA 115K Epoxy manufactured by McCann Manufacturing Company could be used. In the alternative, diffusion bonding between the laminations may be employed. In order to bond the transducer in place, a conductive epoxy may be used such as Ablebond #789-3 copper conductive epoxy.

Various lamination materials may be utilized although a photoetchable material is preferred. For example, AISI type 304 stainless steel is particularly well-suited.

Although particular embodiments of the invention have been shown and described, it will be appreciated that other modifications may be made which occurs to those of ordinary skill in the art and such modifications will fall within the true spirit and scope of the invention as set forth in the appended claims.

I claim:

1. An ink jet apparatus comprising a plurality of channels, each of said channels including a chamber, an inlet opening to said chamber and an ink drop and ejection orifice, the improvement comprising a plurality of layers, each of said layers performing a different function in more than one channel formed by each said layer, at least one of said plurality of said layers being located between immediately adjacent orifices in different ones of said layers so as to provide a high-density multi-channel array wherein the spacing between immediately adjacent chambers is substantially equal to the spacing between immediately adjacent orifices.

2. The ink jet apparatus of claim 1 wherein the chamber of one channel and the transducer of another channel are located in the same layer.

3. The ink jet apparatus of claim 1 wherein the restrictor of one channel and the transducer of another channel are located in the same layer.

4. The ink jet apparatus of claim 1 wherein a deformable wall of one channel between the transducer and the chamber thereof and another non-deformable wall of another channel are located in the same layer.

5. The ink jet apparatus of claim 1 wherein at least two of said chambers and said orifices coupled thereto are aligned with respect to a plane extended transverse to said layers.

6. The ink jet apparatus of claim 5 wherein said orifices and said chambers in said plane are adjacent.

7. The jet apparatus of claim 1 further comprising a supply channel extending transverse to said layers.

8. The ink jet apparatus of claim 7 further comprising a plurality of supply channels extending transverse to said layers.

9. In an ink jet apparatus comprising a plurality of channels, each of said channels including a chamber an ink inlet opening to said chamber, an ink inlet orifice from each said chamber and a transducer coupled to said chamber, said apparatus comprising a laminated structure including a plurality of laminations, each said orifice of each said chamber being located in a different lamination at a different depth in said structure, with a plurality of said laminations located between adjacent orifices at different depths, each of said channels overlapping another channel at the same depth in said structure so as to provide a high-density multi-channel array wherein the spacing between immediaely adjacent chambers is substantially equal to the spacing between immediately adjacent orifices.

10. In an ink jet apparatus comprising a plurality of channels, each of said channels including a chamber, a ink inlet opening to each said chamber, an ink droplet orifice from each said chamber and a transducer coupled to said chamber, said apparatus comprising a laminated structure including a plurality of laminations, each said chamber being located in a different lamination at a different depth in said structure, each channel overlapping another channel at the same depth in said structure, a plurality of said laminations being located between adjacent orifices at different depths so as to provide a high-density multi-channel array wherein the spacing between immediately adjacent chambers is substantially equal to the spacing between immediately adjacent orifices.

11. In an ink jet apparatus comprising a plurality of channels, each of said channels including a chamber, an ink inlet opening to said chamber, an ink droplet orifice from said chamber, and a transducer, said apparatus comprising a laminated structure including a plurality of laminations each said inlet of each said chamber being located in a different lamination at a different depth in said structure, each said channel overlapping another channel at the same depth in said structure, each orifice being separated from an adjacent orifice by a plurality of said laminations so as to provide a high-density multi-channel array wherein the spacing between immediately adjacent chambers is substantially equal to the spacing between immediately adjacent orifices.

* * * * *

UNITED STATES PATENT OFFICE

CERTIFICATE OF CORRECTION

Patent No. 4,392,145 Dated July 5, 1983

Inventor(s) Walter R. Parkola

It is certified that error appears in the above-identified patent and that said Letters Patent are hereby corrected as shown below:

Claim 9, line 16, delete "immediaely" and insert therefor --immediately--.

Signed and Sealed this

*Twenty-fourth* Day of *January 1984*

[SEAL]

*Attest:*

GERALD J. MOSSINGHOFF

*Attesting Officer* *Commissioner of Patents and Trademarks*